(12) United States Patent
Boon et al.

(10) Patent No.: US 9,222,031 B2
(45) Date of Patent: Dec. 29, 2015

(54) SUSPENSION OF SOLID BIOMASS PARTICLES IN A HYDROCARBON-CONTAINING LIQUID

(75) Inventors: Andries Quirin Maria Boon, Amsterdam (NL); Johan Willem Gosselink, Amsterdam (NL); John William Harris, Amsterdam (NL); Andries Hendrik Janssen, Amsterdam (NL); Sander Van Paasen, Amsterdam (NL); Colin John Schaverien, Amsterdam (NL); Nicolaas Wilhelmus Joseph Way, Amsterdam (NL)

(73) Assignee: Shell Oil Company, Houston, TX (US)

( * ) Notice: Subject to any disclaimer, the term of this patent is extended or adjusted under 35 U.S.C. 154(b) by 822 days.

(21) Appl. No.: 13/453,872

(22) Filed: Apr. 23, 2012

(65) Prior Publication Data
US 2012/0277499 A1 Nov. 1, 2012

(30) Foreign Application Priority Data
Apr. 21, 2011 (EP) ..................................... 11163447

(51) Int. Cl.
C10L 1/04 (2006.01)
C10G 1/08 (2006.01)
C10B 49/22 (2006.01)
(Continued)

(52) U.S. Cl.
CPC . *C10G 1/08* (2013.01); *C10B 49/22* (2013.01); *C10B 57/02* (2013.01); *C10B 57/06* (2013.01); *C10G 3/50* (2013.01); *C10G 3/57* (2013.01); *C10G 11/18* (2013.01); *C10L 1/04* (2013.01); *C10L 9/083* (2013.01); *C10G 2300/107* (2013.01); *C10G 2300/1011* (2013.01); *C10G 2300/1022* (2013.01); *C10G 2300/1044* (2013.01); *C10G 2300/1051* (2013.01); *C10G 2300/1055* (2013.01); *C10G 2300/1077* (2013.01); *C10G 2300/4006* (2013.01); *Y02E 50/15* (2013.01)

(58) Field of Classification Search
CPC .............. C10G 1/00; C10G 1/08; C10G 3/10; C10G 3/47; C10G 3/50; C10G 2300/1022; C10G 2300/1044; Y02E 50/14
USPC .............................. 585/240, 242; 44/605, 606
See application file for complete search history.

(56) References Cited

U.S. PATENT DOCUMENTS

| | | | |
|---|---|---|---|
| 4,851,109 A | 7/1989 | Chen et al. | |
| 6,270,655 B1 * | 8/2001 | Ganguli | ........................ 208/85 |

(Continued)

FOREIGN PATENT DOCUMENTS

| | | |
|---|---|---|
| CN | 101824330 | 9/2010 |
| EP | 2107100 | 10/2009 |

(Continued)

OTHER PUBLICATIONS

International Search Report dated Jul. 19, 2012 of PCT/EP2012/057372 filed Apr. 23, 2012.

(Continued)

*Primary Examiner* — Nina Bhat

(57) ABSTRACT

A process to prepare a suspension of solid biomass particles in a hydrocarbon-containing liquid for a catalytic cracking process is provided. A catalytic cracking process and subsequent processing of the cracked product from such suspension of solid biomass particles in the hydrocarbon-containing liquid is also provided.

15 Claims, 1 Drawing Sheet

(51) Int. Cl.
  *C10B 57/02*  (2006.01)
  *C10B 57/06*  (2006.01)
  *C10G 3/00*  (2006.01)
  *C10G 11/18*  (2006.01)
  *C10L 9/08*  (2006.01)

(56) References Cited

U.S. PATENT DOCUMENTS

| | | | |
|---|---|---|---|
| 8,063,258 B2 * | 11/2011 | Bartek et al. | 585/240 |
| 8,236,173 B2 * | 8/2012 | Bartek et al. | 208/400 |
| 8,288,600 B2 * | 10/2012 | Bartek et al. | 585/240 |
| 8,460,406 B2 * | 6/2013 | Lemaire et al. | 44/605 |
| 8,465,627 B2 * | 6/2013 | Brady et al. | 201/2.5 |
| 8,779,225 B2 | 7/2014 | Boon et al. | |
| 2008/0022595 A1 | 1/2008 | Lemaire et al. | |
| 2008/0312479 A1 * | 12/2008 | McCall et al. | 585/240 |
| 2009/0013603 A1 | 1/2009 | Rolland | |
| 2009/0253948 A1 | 10/2009 | McCall et al. | |
| 2010/0105970 A1 | 4/2010 | Yanik et al. | |
| 2013/0276360 A1 | 10/2013 | Boon et al. | |

FOREIGN PATENT DOCUMENTS

| | | |
|---|---|---|
| WO | 2010002792 | 1/2010 |
| WO | 2010135734 | 11/2010 |

OTHER PUBLICATIONS

Zhang et al: "Review of biomass pyrolysis oil properties and upgrading research", Energy Conversion and Management, Elsevier Science Publishers, Oxford, GB, vol. 48, No. 1, Jan. 1, 2007, pp. 87-92, XP005708901.

Lappas A A et al: "Biomass pyrolysis in a circulation fluid bed reactor for the production of fuels and chemicals" Fuel, IPC Science and Technology Press, Guildford, GB, vol. 81, No. 16, Nov. 1, 2002, pp. 2087-2095, XP004374414.

European Search Report dated Nov. 22, 2011 for EP Application No. 11163447.3.

China First Office Action dated Jul. 22, 2014 for China Patent Application No. 201280027753.0.

* cited by examiner

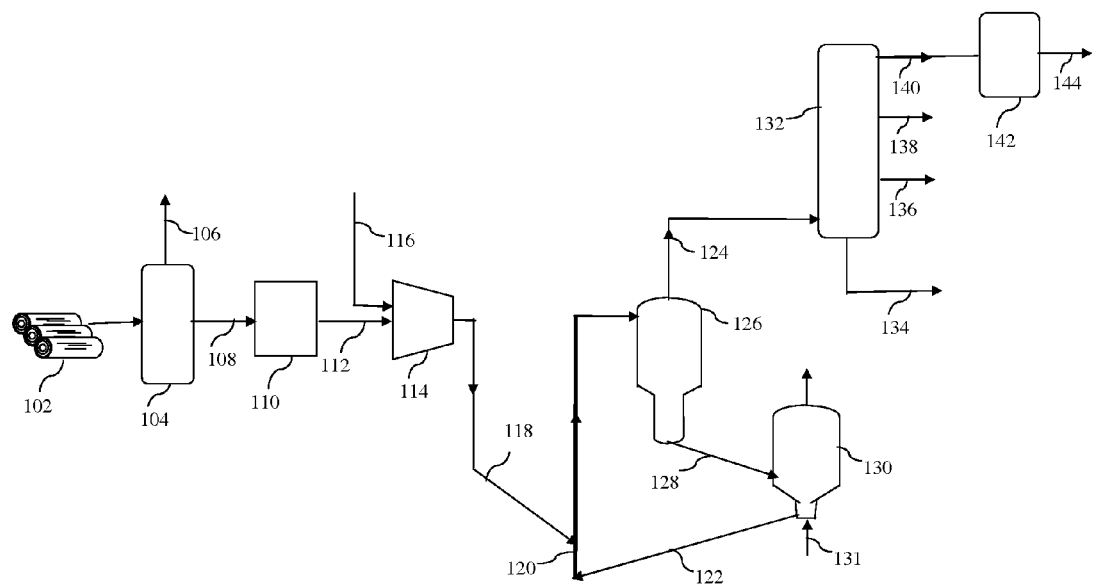

SUSPENSION OF SOLID BIOMASS PARTICLES IN A HYDROCARBON-CONTAINING LIQUID

The present application claims the benefit of European Patent Application No. 11163447.3, filed Apr. 21, 2011 the entire disclosure of which is hereby incorporated by reference.

FIELD OF THE INVENTION

The invention relates to a process for preparing a suspension of solid biomass particles in a hydrocarbon-containing liquid, such suspension and a catalytic cracking process using such a suspension.

BACKGROUND TO THE INVENTION

With the diminishing supply of crude mineral oil, use of renewable energy sources is becoming increasingly important for the production of liquid fuels. These fuels from renewable energy sources are often referred to as biofuels.

Biofuels derived from non-edible renewable energy sources, such as cellulosic materials, are preferred as these do not compete with food production. These biofuels are also referred to as second generation biofuels, renewable or advanced biofuels. Most of these non-edible renewable energy sources, however, are solid biomass materials that are cumbersome to convert into liquid fuels.

For example, the process described in WO 2010/062611 for converting solid biomass to hydrocarbons requires three catalytic conversion steps. First the solid biomass is contacted with a catalyst in a first riser operated at a temperature in the range of from about 50 to about 200° C. to produce a first biomass-catalyst mixture and a first product comprising hydrocarbons (referred to as pretreatment). Hereafter the first biomass-catalyst mixture is charged to a second riser operated at a temperature in the range of from about 200° to about 400° C. to thereby produce a second biomass-catalyst mixture and a second product comprising hydrocarbons (referred to as deoxygenating and cracking); and finally the second biomass-catalyst mixture is charged to a third riser operated at a temperature greater than about 450° C. to thereby produce a spent catalyst and a third product comprising hydrocarbons. The last step is referred to as conversion to produce the fuel or specialty chemical product. WO 2010/062611 mentions the possibility of preparing the biomass for co-processing in conventional petroleum refinery units. The process of WO 2010/062611, however, is cumbersome in that three steps are needed, each step requiring its own specific catalyst.

WO2010/135734 describes a method for co-processing a biomass feedstock and a refinery feedstock in a refinery unit comprising catalytically cracking the biomass feedstock and the refinery feedstock in a refinery unit comprising a fluidized reactor, wherein hydrogen is transferred from the refinery feedstock to carbon and oxygen of the biomass feedstock. In one of the embodiments WO2010/135734 the biomass feedstock comprises a plurality of solid biomass particles having an average size between 50 and 1000 microns. In passing, it is further mentioned that solid biomass particles can be pre-processed to increase brittleness, susceptibility to catalytic conversion (e.g. by roasting, toasting, and/or torrefection) and/or susceptibility to mixing with a petrochemical feedstock. Further WO2010/135734 mentions that the refinery unit can include a feed system that is adapted to provide a suspension of a solid biomass feedstock in a liquefied biomass feedstock or a refinery/petroleum feedstock, for example torrefied biomass particles suspended in a biocrude or crude oil.

However, making a pumpable suspension containing such small particle size biomass particles in a biocrude or crude oil is troublesome due to size limits of milling or grinding of the biomass particles. Suspensions of too large biomass particles suspended in a biocrude or crude oil will tend to be unstable and may cause fluctuations in the feed to a catalytic cracking unit.

It would be an advancement in the art to provide a process that allows one to prepare a suspension of solid biomass material in a hydrocarbon-containing liquid, suitable for feeding to a catalytic cracking unit.

SUMMARY OF THE INVENTION

Such a process has been achieved with the process according to the invention.

Accordingly in an embodiment provides a catalytic cracking process comprising
a) preparing a suspension of solid biomass particles in a hydrocarbon-containing liquid, comprising
 a first particle size reduction step wherein the particle size of a solid biomass material is reduced to produce a first particulate product comprising solid biomass particles;
 a mixing step, wherein the first particulate product is suspended in a hydrocarbon-containing liquid to produce a suspended first particulate product comprising solid biomass particles suspended in the hydrocarbon-containing liquid; and
 a second particle size reduction step, wherein the particle size of the suspended first particulate product is further reduced to produce a suspended second particulate product comprising solid biomass particles suspended in the hydrocarbon-containing liquid; and
b) contacting the suspension produced in step a) with a catalytic cracking catalyst at a temperature of more than 400° C. in a catalytic cracking reactor to produce one or more cracked products.

In another embodiment is provided a suspension of solid biomass particles in a hydrocarbon-containing liquid, produced by a process comprising
 a first particle size reduction step wherein the particle size of a solid biomass material is reduced to produce a first particulate product comprising solid biomass particles;
 a mixing step, wherein the first particulate product is suspended in a hydrocarbon-containing liquid to produce a suspended first particulate product comprising solid biomass particles suspended in the hydrocarbon-containing liquid; and
 a second particle size reduction step, wherein the particle size of the suspended first particulate product is further reduced to produce a suspended second particulate product comprising solid biomass particles suspended in the hydrocarbon-containing liquid thereby producing the suspension.

The suspension produced in step a), that is the suspended second particulate product comprising solid biomass particles suspended in the hydrocarbon-containing liquid, advantageously allows for a stable and pumpable suspension of solid biomass particles in a hydrocarbon-containing liquid, which suspension is suitable for feeding to a catalytic cracking reactor.

It also assists in providing a continuous composition of the feed, avoiding large fluctuations in the concentration of solid biomass material to such a catalytic cracking reactor.

In addition, the process according to the invention reduces the risk of formation of hot spots in the catalytic cracking reactor which could lead to the formation of excessive amounts of char, an unwanted product.

The processes according to the invention are low in construction costs. In addition they are simple and require a minimum of processing steps.

Furthermore the processes according to the invention can be easily implemented in existing refineries. In addition the processes according to the invention may assist in reducing coke formation in the catalytic cracking reactor.

The one or more cracked products produced by the catalytic cracking process according to the invention can be used as an intermediate to prepare a biofuel and/or biochemical component.

The biofuel and/or biochemical component(s) may advantageously be further converted to and/or blended with one or more further components into biofuels and/or biochemicals.

BRIEF DESCRIPTION OF THE DRAWINGS

FIG. 1 shows a schematic diagram of one embodiment of the process according to the invention.

DETAILED DESCRIPTION OF THE INVENTION

By a solid biomass material is herein understood a solid material obtained from a renewable source. By a renewable source is herein understood a composition of matter of biological origin as opposed to a composition of matter obtained or derived from petroleum, natural gas or coal. Without wishing to be bound by any kind of theory it is believed that such material obtained from a renewable source may preferably contain carbon-14 isotope in an abundance of about 0.0000000001%, based on total moles of carbon.

Preferably the renewable source is a composition of matter of cellulosic or lignocellulosic origin. Any solid biomass material may be used in the process of the invention. In a preferred embodiment the solid biomass material is not a material used for food production. Examples of preferred solid biomass materials include aquatic plants and algae, agricultural waste and/or forestry waste and/or paper waste and/or plant material obtained from domestic waste.

Preferably the solid biomass material contains cellulose and/or lignocellulose. Examples of suitable cellulose- and/or lignocellulose-containing materials include agricultural wastes such as corn stover, soybean stover, corn cobs, rice straw, rice hulls, oat hulls, corn fibre, cereal straws such as wheat, barley, rye and oat straw; grasses; forestry products and/or forestry residues such as wood and wood-related materials such as sawdust; waste paper; sugar processing residues such as bagasse and beet pulp; or mixtures thereof. More preferably the solid biomass material is selected from the group consisting of wood, sawdust, straw, grass, bagasse, corn stover and/or mixtures thereof.

The solid biomass material may have undergone drying and/or torrefaction, steam explosion, densification and/or pelletization before the first particle size reduction step or in between the first particle size reduction step and the mixing step, to allow for improved process operability and economics.

In one preferred embodiment, the solid biomass material used in the first particle size reduction step is a torrefied solid biomass material. In this embodiment the process according to the invention for preparing the suspension comprising a torrefaction step before the first particle size reduction step, wherein the solid biomass material is torrefied at a temperature of more than 200° C. to produce a torrefied solid biomass material. The words torrefying and torrefaction are used interchangeable herein.

In another preferred embodiment the first particulate product is torrefied to produce a torrefied first particulate product and the process comprises such a torrefaction step after the first particle size reduction step and before the mixing step.

Although less preferred, it is further possible to use a torrefied solid biomass material in the first particle size reduction step and subsequently also torrefy the first particulate product.

By torrefying or torrefaction is herein understood the treatment of the solid biomass material at a temperature in the range from equal to or more than 200° C. to equal to or less than 350° C. in the essential absence of a catalyst and in an oxygen-poor, preferably an oxygen-free, atmosphere. By an oxygen-poor atmosphere is understood an atmosphere containing equal to or less than 15 vol. % oxygen, preferably equal to or less than 10 vol. % oxygen and more preferably equal to or less than 5 vol. % oxygen. By an oxygen-free atmosphere is understood that the torrefaction is carried out in the essential absence of oxygen.

Torrefying of the solid biomass material is preferably carried out at a temperature of more than 200° C., more preferably at a temperature equal to or more than 210° C., still more preferably at a temperature equal to or more than 220° C., yet more preferably at a temperature equal to or more than 230° C. In addition torrefying of the solid biomass material is preferably carried out at a temperature less than 350° C., more preferably at a temperature equal to or less than 330° C., still more preferably at a temperature equal to or less than 310° C., yet more preferably at a temperature equal to or less than 300° C.

Torrefaction of the solid biomass material is preferably carried out in the essential absence of oxygen. More preferably the torrefaction is carried under an inert atmosphere, containing for example inert gases such as nitrogen, carbon dioxide and/or steam; and/or under a reducing atmosphere in the presence of a reducing gas such as hydrogen, gaseous hydrocarbons such as methane and ethane or carbon monoxide.

The torrefying step may be carried out at a wide range of pressures. Preferably, however, the torrefying step is carried out at atmospheric pressure (about 1 bar absolute, corresponding to about 0.1 MegaPascal).

The torrefying step may be carried out batchwise or continuously. If operated batchwise, a torrefaction reactor may be filled with solid biomass material, whereafter the solid biomass material in the torrefaction reactor may be heated at the torrefaction temperature for a time period in the range from 1 minute to 12 hours, more preferably for a period in the range from 30 minutes to 8 hours and most preferably for a period in the range from 1 to 6 hours. Hereafter the torrefaction reactor may be cooled down and emptied to start a new cycle.

If operated continuously, for example the TORSPYD (trademark) process of Thermya may be used, wherein a flow of solid biomass material flows from top to bottom in a reactor column, counter-currently to a flow of gas flowing from bottom to top of the reactor column. The temperature of the reactor column gradually increases from top to bottom. Residence time for the solid biomass material in the torrefaction reactor may lie in the range from equal to or more than 0.5 minute, more preferably equal to or more than 5 minutes and most preferably equal to or more than 15 minutes to equal to or less than 2 hours, more preferably equal to or less than 1 hour and most preferably equal to or less than 45 minutes.

The torrefied solid biomass material or torrefied first particulate product has a higher energy density, a higher mass density and greater flowability, making it easier to transport, pelletize and/or store. Being more brittle, it can be easier reduced into smaller particles.

Preferably the torrefied solid biomass material or torrefied first particulate product has an oxygen content in the range from equal to or more than 10 wt %, more preferably equal to or more than 20 wt % and most preferably equal to or more than 30 wt % oxygen, to equal to or less than 60 wt %, more preferably equal to or less than 50 wt %, based on total weight of dry matter (i.e. water-free matter).

During torrefaction, torrefaction gases can be produced. These torrefaction gases can contain carbon monoxide and carbon dioxide but also volatile fuels such as for example methane, ethane, ethene and/or methanol. In a preferred embodiment according to this invention, these volatile fuels are retrieved from the torrefaction gases and recycled to the process as a fuel to provide at least part of the heat for the torrefaction and/or the catalytic cracking in the process according to the invention. In a further embodiment carbon monoxide and/or carbon dioxide may be retrieved from the torrefaction gases and recycled to provide the inert or reducing atmosphere for torrefaction.

In a further preferred embodiment, torrefaction further comprises drying the solid biomass material or first particulate product before such material or product is torrefied. In such a drying step, the solid biomass material or first particulate product is preferably dried until a moisture content is obtained in the range of equal to or more than 0.1 wt % to equal to or less than 25 wt %, more preferably in the range of equal to or more than 5 wt % to equal to or less than 20 wt %, and most preferably in the range of equal to or more than 5 wt % to equal to or less than 15 wt %. For practical purposes moisture content can be determined via ASTM E1756-01 Standard Test method for Determination of Total solids in Biomass. In this method the loss of weight during drying is a measure for the original moisture content.

In the first particle size reduction step the particle size of a solid biomass material is reduced to produce a first particulate product.

The solid biomass material used as a feed in the first particle size reduction step may vary widely in its particle size. The solid biomass material may comprise whole trees, but also wood blocks or even wood chips. For example the solid biomass material may have a particle size distribution with a mean particle size in the range from equal to or more than 0.1 centimeter, more preferably equal to or more than 0.5 centimeter, even more preferably equal to or more than 1 centimeter; to equal to or less than 30 meter, more preferably equal to or less than 20 meter, more preferably equal to or less than 10 meter, even more preferably equal to or less than 3 meter and most preferably equal to or less than 1 meter.

The first particle size reduction step preferably comprises reducing the particle size of the solid biomass material such that the solid biomass particles in the second particulate product have a particle size distribution with a mean particle size in the range from equal to or more than 10 micrometer, more preferably equal to or more than 50 micrometer, more preferably equal to or more than 100 micrometer, even more preferably equal to or more than 200 micrometer; to equal to or less than 3000 micrometer, more preferably equal to or less than 1000 micrometer, even more preferably equal to or less than 500 micrometer and most preferably equal to or less than 300 micrometer.

Preferably at least 80 wt % of the solid biomass particles in the first particulate product has a particle size of equal to or less than 1000 micrometer, more preferably equal to or less than 500 micrometer, and most preferably equal to or less than 300 micrometer.

For practical purposes, particle size of the solid biomass material and/or the solid biomass particles in the first particulate product may be determined by measurement via the apparatus used for particle size reduction.

In case of doubt, the mean particle size for solid biomass material can be determined by sieving, whereas the mean particle size of the solid biomass particles in the first particulate product can be determined by a laser scattering particle size distribution analyzer (for example a Horiba LA950, according to the ISO 13320 method titled "Particle size analysis—Laser diffraction methods").

The particle size of the, optionally torrefied, solid biomass material can be reduced in any manner known to the skilled person to be suitable for this purpose. Suitable methods for particle size reduction include crushing, grinding and/or milling. The particle size reduction may for example be achieved by means of a ball mill, roller mill, hammer mill, (knife) shredder, chipper, knife grid, cutter and/or a combination thereof.

In the mixing step, the first particulate product is suspended in a hydrocarbon-containing liquid to produce a suspended first particulate product comprising solid biomass particles suspended in the hydrocarbon-containing liquid. This advantageously improves processability and reduces dusting.

By a hydrocarbon-containing liquid is herein understood a liquid that contains one or more hydrocarbon compounds. In a preferred embodiment the hydrocarbon feed essentially consists of one or more hydrocarbon compounds. By hydrocarbon compounds are herein understood compounds that contain both hydrogen and carbon and preferably consist of hydrogen and carbon.

The hydrocarbon-containing liquid can be any hydrocarbon-containing liquid known to the skilled person to be suitable as a feed for a catalytic cracking unit.

The hydrocarbon-containing liquid can for example be obtained from a conventional crude oil (also sometimes referred to as a petroleum oil or mineral oil), an unconventional crude oil (that is, oil produced or extracted using techniques other than the traditional oil well method), an oil obtained from a renewable source (such as pyrolysis oil, vegetable oil and/or a so-called liquefaction product) or a Fisher Tropsch oil. The hydrocarbon-containing liquid may also comprise mixtures of the above.

In one embodiment the hydrocarbon-containing liquid is derived from a, preferably conventional, crude oil. Examples of conventional crude oils include West Texas Intermediate crude oil, Brent crude oil, Dubai-Oman crude oil, Arabian Light crude oil, Midway Sunset crude oil or Tapis crude oil.

More preferably the hydrocarbon-containing liquid comprises a fraction of a, preferably conventional, crude oil or renewable oil. Preferred hydrocarbon-containing liquids include straight run (atmospheric) gas oils, flashed distillate, vacuum gas oils (VGO), coker gas oils, diesel, gasoline, kerosene, naphtha, liquefied petroleum gases, atmospheric residue ("long residue") and vacuum residue ("short residue") and/or mixtures thereof. Most preferably the hydrocarbon-containing liquid comprises a long residue, a vacuum gas oil and/or mixtures thereof.

The composition of the hydrocarbon-containing liquid may vary widely. The hydrocarbon-containing liquid may for example contain paraffins, naphthenes, olefins and/or aromatics. Hence, the hydrocarbon-containing liquid may contain preferably paraffins, olefins and aromatics. Preferably the hydrocarbon-containing liquid comprises in the range from equal to or more than 50 wt %, more preferably from equal to or more than 75 wt %, and most preferably from equal to or more than 90 wt % to equal to or less than 100 wt % of compounds consisting only of carbon and hydrogen, based on the total weight of the hydrocarbon-containing liquid.

Preferably the hydrocarbon-containing liquid comprises equal to or more than 1 wt % paraffins, more preferably equal to or more than 5 wt % paraffins, and most preferably equal to or more than 10 wt % paraffins, and preferably equal to or less than 100 wt % paraffins, more preferably equal to or less than 90 wt % paraffins, and most preferably equal to or less than 30 wt % paraffins, based on the total weight of hydrocarbon-containing liquid. By paraffins normal-, cyclo- and branched-paraffins are understood.

In a preferred embodiment the hydrocarbon-containing liquid comprises or consists of a paraffinic hydrocarbon-containing liquid.

By a paraffinic hydrocarbon-containing liquid is herein understood a hydrocarbon-containing liquid that comprising at least 50 wt % of paraffins, preferably at least 70 wt % of paraffins, based on the total weight of the hydrocarbon-containing liquid. For practical purposes the paraffin content of all hydrocarbon-containing liquid having an initial boiling point of at least 260° C. can be measured by means of ASTM method D2007-03 titled "Standard test method for characteristic groups in rubber extender and processing oils and other petroleum-derived oils by clay-gel absorption chromatographic method", wherein the amount of saturates will be representative for the paraffin content. For all other hydrocarbon-containing liquid the paraffin content of the hydrocarbon-containing liquid can be measured by means of comprehensive multi-dimensional gas chromatography (GC×GC), as described in P. J. Schoenmakers, J. L. M. M. Oomen, J. Blomberg, W. Genuit, G. van Velzen, J. Chromatogr. A, 892 (2000) p. 29 and further.

Examples of paraffinic hydrocarbon-containing liquid include so-called Fischer-Tropsch derived hydrocarbon streams such as described in WO2007/090884 and herein incorporated by reference, or a hydrogen rich feed like hydrotreater product or hydrowax. By Hydrowax is understood the bottoms fraction of a hydrocracker. Examples of hydrocracking processes which may yield a bottoms fraction that can be used as hydrocarbon-containing liquid, are described in EP-A-699225, EP-A-649896, WO-A-97/18278, EP-A-705321, EP-A-994173 and U.S. Pat. No. 4,851,109 and herein incorporated by reference.

In a preferred embodiment the hydrocarbon-containing liquid comprises equal to or more than 8 wt % elemental hydrogen, more preferably more than 12 wt % elemental hydrogen, based on the total weight of hydrocarbon-containing liquid on a dry basis (i.e. water-free). A high content of elemental hydrogen, such as a content of equal to or more than 8 wt %, allows the hydrocarbon-containing liquid to act as a cheap hydrogen donor in the catalytic cracking process. A particularly preferred hydrocarbon-containing liquid having an elemental hydrogen content of equal to or more than 8 wt % is Fischer-Tropsch derived waxy raffinate. Such Fischer-Tropsch derived waxy raffinate may for example comprise about 85 wt % of elemental carbon and 15 wt % of elemental hydrogen.

The weight ratio of hydrocarbon-containing liquid to first particulate product is preferably equal to or more than 50 to 50 (5:5), more preferably equal to or more than 70 to 30 (7:3), still more preferably equal to or more than 80 to 20 (8:2), even still more preferably equal to or more than 90 to 10 (9:1). For practical purposes the weight ratio of the hydrocarbon-containing liquid to first particulate product is preferably equal to or less than 99.9 to 0.1 (99.9:0.1), more preferably equal to or less than 95 to 5 (95:5).

The weight of first particulate product, based on the total weight of first particulate product and hydrocarbon-containing liquid, is preferably equal to or less than 30 wt %, more preferably equal to or less than 20 wt %, most preferably equal to or less than 10 wt % and even more preferably equal to or less than 5 wt %. For practical purposes the weight of first particulate product, based on the total weight of first particulate product and hydrocarbon-containing liquid is preferably equal to or more than 0.1 wt %, more preferably equal to or more than 1 wt %.

In the second particle size reduction step, the particle size of the suspended first particulate product is further reduced to produce a suspended second particulate product comprising solid biomass particles suspended in the hydrocarbon-containing liquid.

The second particulate product suitably has a particle size distribution with a mean particle size $S2$ that is smaller than the mean particle size $S1$ of the particle size distribution of the first particulate product.

The second particle size reduction step preferably comprises reducing the particle size of the first particulate product such that the solid biomass particles in the second particulate product have a particle size distribution with a mean particle size in the range from equal to or more than 0.1 micrometer, more preferably equal to or more than 0.5 micrometer, more preferably equal to or more than 1 micrometer, even more preferably equal to or more than 5 micrometer, and most preferably equal to or more than 10 micrometer; to equal to or less than 1000 micrometer, more preferably equal to or less than 300 micrometer, even more preferably equal to or less than 200 micrometer, even more preferably equal to or less than 100 micrometer and most preferably equal to or less than 50 micrometer.

Preferably at least 80 wt % of the solid biomass particles in the second particulate product has a particle size of equal to or less than 200 micrometer, more preferably equal to or less than 100 micrometer, and most preferably equal to or less than 50 micrometer.

Without wishing to be bound by any kind of theory it is believed that the extent to which the solid biomass material is converted in a catalytic cracking reactor may depend on the particle size of the solid biomass material. A solid biomass material having a particle size distribution with a mean particle size of about 1000 micrometer will be less quickly converted than a solid biomass material having a particle size distribution with a mean particle size of about 100 micrometer.

For practical purposes, particle size of solid biomass particles in the second particulate product may be determined by measurement via the apparatus used for particle size reduction.

In case of doubt, the mean particle size of the solid biomass particles in the second particulate product can be determined by a laser scattering particle size distribution analyzer (for example a Horiba LA950, according to the ISO 13320 method titled "Particle size analysis—Laser diffraction methods").

The particle size of the first particulate product suspended in the hydrocarbon-containing liquid can be reduced in any manner known to the skilled person to be suitable for this purpose.

In a preferred embodiment the mixing step and the second particle size reduction step are integrated, preferably in a colloid mixer or an extruder.

The first particle size reduction step, the mixing step and the second particle size reduction step may be carried out at a wide range of temperatures and pressures.

Preferably the steps are carried out at a temperature in the range from equal to or more than 0° C. to equal to or less than 400° C., more preferably in the range from equal to or more than 10° C., or even equal to or more than 20° C. to equal to or less than 200° C.

In one preferred embodiment one or more of the step(s) are carried out at ambient temperature (about 20° C.)

In another preferred embodiment the first particle size reduction step may be carried out at a temperature in the range from equal to or more than 40° C. to equal to or less than 400° C., more preferably in the range from equal to or more than 50° C. to equal to or less than 300° C., for example where a just torrefied solid biomass material is used as a feed.

In a still other preferred embodiment the mixing step, optionally integrated with the second particle size reduction step, may be carried out at a temperature in the range from equal to or more than 40° C. to equal to or less than 400° C., more preferably in the range from equal to or more than 50° C. to equal to or less than 300° C., for example where a highly viscous hydrocarbon-containing liquid is used and such higher temperature is advantageous for suspending the solid biomass particles.

Preferably the steps are carried out at a pressure in the range from equal to or more than 0.1 bar absolute (0.01 MegaPascal) to equal to or less than 30 bar absolute (3.0 MegaPascal). In one preferred embodiment one or more of the step(s) are carried out at ambient pressure (about 1 bar absolute, corresponding to about 0.1 MegaPascal).

The present invention provides a catalytic cracking process comprising contacting the second suspension (i.e. the suspended second particulate product) produced as described above with a catalytic cracking catalyst at a temperature of more than 400° C. in a catalytic cracking reactor to produce one or more cracked products.

Preferably the catalytic cracking reactor is a fluidized catalytic cracking reactor. Preferably this catalytic cracking reactor is part of a catalytic cracking unit, more preferably of a fluidized catalytic cracking (FCC) unit.

Most preferably the catalytic cracking reactor is a riser reactor. By a riser reactor is herein understood an elongated, preferably essentially tube-shaped, reactor suitable for carrying out catalytic cracking reactions. Suitably a fluidized catalytic cracking catalyst flows in the riser reactor from the upstream end to the downstream end of the reactor. The elongated, preferably tube-shaped, reactor is preferably oriented in an essentially vertical manner. Suitably, the fluidized catalytic cracking catalyst flows from the bottom of the riser reactor upwards to the top of the riser reactor.

Examples of suitable riser reactors are described in the Handbook titled "Fluid Catalytic Cracking technology and operations", by Joseph W. Wilson, published by PennWell Publishing Company (1997), chapter 3, especially pages 101 to 112, herein incorporated by reference.

The riser reactor may be a so-called internal riser reactor or a so-called external riser reactor as described therein.

Most preferably the internal riser reactor is an essentially vertical, preferably essentially tube-shaped, reactor, that may have an essentially vertical upstream end located outside a vessel and an essentially vertical downstream end located inside the vessel. The vessel is suitably a reaction vessel suitable for catalytic cracking reactions and/or a vessel that comprises one or more cyclone separators and/or swirl tubes. The internal riser reactor is especially advantageous, because in the catalytic cracking reactor the solid biomass material may be converted into an intermediate oil product. Without wishing to be bound to any kind of theory it is believed that this intermediate oil product or pyrolysis oil may be more prone to polymerization than conventional oils due to oxygen-containing hydrocarbons and/or olefins that may be present in the intermediate oil product. In addition the intermediate oil product may be more corrosive than conventional oils due to oxygen-containing hydrocarbons that may be present. The use of an internal riser reactor allows one to reduce the risk of plugging due to polymerization and/or to reduce the risk of corrosion, thereby increasing safety and hardware integrity.

By an external riser reactor is herein preferably understood a riser reactor that is located outside a vessel. The external riser reactor can suitably be connected via a so-called crossover to a vessel.

Preferably the external riser reactor comprises a, preferably essentially vertical, riser reactor pipe. Such a riser reactor pipe is located outside a vessel. The riser reactor pipe may suitably be connected via a, preferably essentially horizontal, downstream crossover pipe to a vessel. The downstream crossover pipe preferably has a direction essentially transverse to the direction of the riser reactor pipe. The vessel may suitably be a reaction vessel suitable for catalytic cracking reactions and/or a vessel that comprises one or more cyclone separators and/or swirl separators.

When an external riser reactor is used, it may be advantageous to use an external riser reactor with a curve or low velocity zone at its termination as for example illustrated in the Handbook titled "Fluid Catalytic Cracking technology and operations", by Joseph W. Wilson, published by PennWell Publishing Company (1997), chapter 3, FIG. 3-7, herein incorporated by reference.

By a low velocity zone is herein preferably understood a zone or an area within the external riser reactor where the velocity of the, preferably fluidized, catalytic cracking catalyst shows a minimum. The low velocity zone may for example comprise an accumulation space located at the most downstream end of the upstream riser reactor pipe as described above, extending such riser reactor pipe beyond the connection with the crossover pipe. An example of a low velocity zone is the so-called "Blind Tee".

It has been advantageously found that a part of the catalytic cracking catalyst may deposit in the curve or low velocity zone, thereby forming a protective layer against corrosion by the catalytic cracking catalyst and any residual solid particles and/or any oxygen-containing hydrocarbons as explained above.

In a preferred embodiment the suspension of solid biomass particles in hydrocarbon-containing liquid is supplied to the riser reactor in the most upstream half, more preferably in the most upstream quarter, and even more preferably at the most upstream tenth of the riser reactor. Most preferably the suspension of solid biomass particles in the hydrocarbon-containing liquid is supplied to the riser reactor at the bottom of this reactor. Addition of the solid biomass material in the most upstream part, preferably the bottom, of the reactor may advantageously result in in-situ water formation at the upstream part, preferably the bottom, of the reactor. The in-situ water formation may lower the hydrocarbon partial pressure and reduce second order hydrogen transfer reactions, thereby resulting in higher olefin yields. Preferably the hydrocarbon partial pressure is lowered to a pressure in the range from 0.7 to 2.8 bar absolute (0.07 to 0.28 MegaPascal), more preferably 1.2 to 2.8 bar absolute (0.12 to 0.28 MegaPascal).

It may be advantageous to also add a lift gas at the bottom of the riser reactor. Examples of such a liftgas include steam or vaporized naphtha, steam is most preferred as a lift gas.

If the suspension of solid biomass particles in hydrocarbon-containing liquid (i.e. herein also referred to as the suspended second particulate product) is supplied at the bottom of the riser reactor, is may optionally be mixed with such a lift gas before entry in the riser reactor. If the suspension is not mixed with the liftgas prior to entry into the riser reactor it may be fed simultaneously with the liftgas (at one and the same location) to the riser reactor, and optionally mixed upon entry of the riser reactor; or it may be fed separately from any liftgas (at different locations) to the riser reactor. Preferably the liftgas comprises steam. Most preferably the liftgas consists of steam.

When both the suspension and steam are introduced into the bottom of the riser reactor, the steam-to-suspension weight ratio is preferably in the range from equal to or more than 0.01:1, more preferably equal to or more than 0.05:1 to equal to or less than 5:1, more preferably equal to or less than 1.5:1.

When the suspension is introduced at the bottom of the riser reactor, it can be advantageous to increase the residence time of the solid biomass material at that part of the riser reactor by increasing the diameter of the riser reactor at the bottom. Hence in a preferred embodiment the riser reactor comprises a riser reactor pipe and a bottom section, which bottom section has a larger diameter than the riser reactor pipe, and wherein the suspension is supplied to the riser reactor in the bottom section.

Where applicable a diameter is herein understood to refer to the inner diameter, as for example the inner (i.e. internal) diameter of the bottom section or riser reactor pipe. Preferably the maximum inner diameter of the bottom section of the riser reactor is larger than the maximum inner diameter of the riser reactor pipe.

The bottom section having the larger diameter may for example have the form of a lift pot. The bottom section having the larger diameter is therefore also herein referred to as liftpot or enlarged bottom section.

Such a enlarged bottom section preferably has a diameter larger than the diameter of the riser reactor pipe, more preferably a diameter in the range from equal to or more than 0.4 to equal to or less than 5 meters, most preferably a diameter in the range from equal to or more than 1 to equal to or less than 2 meters. The height of the enlarged bottom section or liftpot preferably lies in the range from equal to or more than 1 meter to equal to or less than 5 meter.

In a preferred embodiment the catalytic cracking process further comprises contacting a fluid hydrocarbon co-feed with the catalytic cracking catalyst in the catalytic cracking reactor. Such a fluid hydrocarbon co-feed would be supplied to the catalytic cracking reactor in addition to the hydrocarbon-containing liquid supplied as part of the suspension. Preferably the catalytic cracking reactor would be a riser reactor, and the fluid hydrocarbon co-feed would be supplied to the riser reactor at a location downstream of the location where the suspension of solid biomass particles in hydrocarbon-containing liquid is supplied. The weight ratio of fluid hydrocarbon co-feed to hydrocarbon-containing liquid (co-feed:HC liquid weight ratio) preferably lies in the range from 1:4 to 4:1, more preferably in the range from 1:1 to 3:1.

Preferences for the fluid hydrocarbon co-feed would be as described for the hydrocarbon-containing liquid above. In an especially preferred embodiment, the hydrocarbon containing liquid would comprise naphtha, diesel or kerosene, where the fluid hydrocarbon co-feed would comprise short residue, long residue or vacuum gas oil.

Preferably the temperature in the reactor ranges from equal to or more than 450° C., more preferably from equal to or more than 480° C., to equal to or less than 800° C., more preferably equal to or less than 750° C.

Preferably the temperature at the location where the suspension of solid biomass particles in hydrocarbon-containing liquid is supplied to the catalytic cracking reactor lies in the range from equal to or more than 500° C., more preferably equal to or more than 550° C., and most preferably equal to or more than 600° C., to equal to or less than 800° C., more preferably equal to or less than 750° C., even more preferably equal to or less than 700° C. and most preferably equal to or less than 650° C.

It can be advantageous to supply the suspension to a location in the catalytic cracking reactor where the temperature is slightly higher, for example where the temperature lies in the range from equal to or more than 700° C., more preferably equal to or more than 720° C., even more preferably equal to or more than 732° C. to equal to or less than 800° C., more preferably equal to or less than 750° C. Without wishing to be bound by any kind of theory, such is believed to allow for a quicker conversion of the solid biomass particles.

Preferably the pressure in the catalytic cracking reactor ranges from equal to or more than 0.5 bar absolute to equal to or less than 10 bar absolute (0.05 MegaPascal-1.0 MegaPascal), more preferably from equal to or more than 1.0 bar absolute to equal to or less than 6 bar absolute (0.1 MegaPascal to 0.6 MegaPascal).

Preferably the total average residence time of the suspension lies in the range from equal to or more than 1 second, more preferably equal to or more than 1.5 seconds and even more preferably equal to or more than 2 seconds to equal to or less than 10 seconds, preferably equal to or less than 5 seconds and more preferably equal to or less than 4 seconds.

The weight ratio of catalyst to feed (that is the total feed of solid biomass material and all fluid hydrocarbon feed)—herein also referred to as—catalyst:feed ratio—preferably lies in the range from equal to or more than 1:1, more preferably from equal to or more than 2:1 and most preferably from equal to or more than 3:1 to equal to or less than 150:1, more preferably to equal to or less than 100:1, most preferably to equal to or less than 50:1.

The weight ratio of catalyst to suspension (catalyst:suspension weight ratio) at the location where the suspension is supplied to the catalytic cracking reactor preferably lies in the range from equal to or more than 1:1, more preferably from equal to or more than 2:1 and most preferably from equal to or more than 3:1 to equal to or less than 150:1, more preferably to equal to or less than 100:1, most preferably to equal to or less than 50:1.

When entering the catalytic cracking reactor the hydrocarbon-containing liquid in the suspension preferably vaporizes upon entry and preferably is contacted in the gaseous state with the catalytic cracking catalyst. The solid biomass particles are preferably converted to an intermediate oil product which is preferably subsequently vaporized too.

The suspension of solid biomass particles in hydrocarbon-containing liquid can be supplied to the catalytic cracking reactor in any manner known to the person skilled in the art. Preferably the suspension is supplied via a positive displacement pump, a centrifugal pump or a combination thereof. The positive displacement pump is especially preferred as it allows for a constant flow of the feed.

The catalytic cracking catalyst can be any catalyst known to the skilled person to be suitable for use in a cracking process. Preferably, the catalytic cracking catalyst comprises a zeolitic component. In addition, the catalytic cracking catalyst can contain an amorphous binder compound and/or a filler. Examples of the amorphous binder component include silica, alumina, titania, zirconia and magnesium oxide, or combinations of two or more of them. Examples of fillers include clays (such as kaolin).

The zeolite is preferably a large pore zeolite. The large pore zeolite includes a zeolite comprising a porous, crystalline aluminosilicate structure having a porous internal cell structure on which the major axis of the pores is in the range of 0.62 nanometer to 0.8 nanometer. The axes of zeolites are depicted in the 'Atlas of Zeolite Structure Types', of W. M. Meier, D. H. Olson, and Ch. Baerlocher, Fourth Revised Edition 1996, Elsevier, ISBN 0-444-10015-6. Examples of such large pore zeolites include FAU or faujasite, preferably synthetic faujasite, for example, zeolite Y or X, ultra-stable zeolite Y (USY), Rare Earth zeolite Y (=REY) and Rare Earth USY (REUSY). According to the present invention USY is preferably used as the large pore zeolite.

The catalytic cracking catalyst can also comprise a medium pore zeolite. The medium pore zeolite that can be used according to the present invention is a zeolite comprising a porous, crystalline aluminosilicate structure having a porous internal cell structure on which the major axis of the pores is in the range of 0.45 nanometer to 0.62 nanometer. Examples of such medium pore zeolites are of the MFI structural type, for example, ZSM-5; the MTW type, for example, ZSM-12; the TON structural type, for example, theta one; and the FER structural type, for example, ferrierite. According to the present invention, ZSM-5 is preferably used as the medium pore zeolite.

According to another embodiment, a blend of large pore and medium pore zeolites may be used. The ratio of the large pore zeolite to the medium pore size zeolite in the cracking catalyst is preferably in the range of 99:1 to 70:30, more preferably in the range of 98:2 to 85:15.

The total amount of the large pore size zeolite and/or medium pore zeolite that is present in the cracking catalyst is preferably in the range of 5 wt % to 40 wt %, more preferably in the range of 10 wt % to 30 wt %, and even more preferably in the range of 10 wt % to 25 wt % relative to the total mass of the catalytic cracking catalyst.

The catalytic cracking catalyst can be contacted in a cocurrent-flow, countercurrent-flow or cross-flow configuration with the suspension of solid biomass particles in hydrocarbon-containing liquid. Preferably the catalytic cracking catalyst is contacted in a cocurrent flow configuration with the suspension.

In a preferred embodiment the catalytic cracking process comprises:
a catalytic cracking step comprising contacting the suspension (herein also referred to as suspended second particulate product) with a catalytic cracking catalyst at a temperature of more than 400° C. in a catalytic cracking reactor to produce one or more cracked products and a spent catalytic cracking catalyst;
a separation step comprising separating the one or more cracked products from the spent catalytic cracking catalyst;
a regeneration step comprising regenerating spent catalytic cracking catalyst to produce a regenerated catalytic cracking catalyst, heat and carbon dioxide; and
a recycle step comprising recycling the regenerated catalytic cracking catalyst to the catalytic cracking step.

The catalytic cracking step is preferably carried out as described herein before.

The separation step is preferably carried out with the help of one or more cyclone separators and/or one or more swirl tubes. Suitable ways of carrying out the separation step are for example described in the Handbook titled "Fluid Catalytic Cracking; Design, Operation, and Troubleshooting of FCC Facilities" by Reza Sadeghbeigi, published by Gulf Publishing Company, Houston, Tex. (1995), especially pages 219-223 and the Handbook "Fluid Catalytic Cracking technology and operations", by Joseph W. Wilson, published by PennWell Publishing Company (1997), chapter 3, especially pages 104-120, and chapter 6, especially pages 186 to 194, herein incorporated by reference. The cyclone separators are preferably operated at a velocity in the range from 18 to 80 meters/second, more preferably at a velocity in the range from 25 to 55 meters/second.

In addition the separation step may further comprise a stripping step. In such a stripping step the spent catalyst may be stripped to recover the products absorbed on the spent catalyst before the regeneration step. These products may be recycled and added to the cracked product stream obtained from the catalytic cracking step.

The regeneration step preferably comprises contacting the spent catalytic cracking catalyst with an oxygen containing gas in a regenerator at a temperature of equal to or more than 550° C. to produce a regenerated catalytic cracking catalyst, heat and carbon dioxide. During the regeneration coke, that can be deposited on the catalyst as a result of the catalytic cracking reaction, is burned off to restore the catalyst activity.

The oxygen containing gas may be any oxygen containing gas known to the skilled person to be suitable for use in a regenerator. For example the oxygen containing gas may be air or oxygen-enriched air. By oxygen enriched air is herein understood air comprising more than 21 vol. % oxygen ($O_2$), more preferably air comprising equal to or more than 22 vol. % oxygen, based on the total volume of air.

The heat produced in the exothermic regeneration step is preferably employed to provide energy for the endothermic catalytic cracking step. In addition the heat produced can be used to heat water and/or generate steam. The steam may be used elsewhere in the refinery, for example as a liftgas in the riser reactor.

Preferably the spent catalytic cracking catalyst is regenerated at a temperature in the range from equal to or more than 575° C., more preferably from equal to or more than 600° C., to equal to or less than 950° C., more preferably to equal to or less than 850° C. Preferably the spent catalytic cracking catalyst is regenerated at a pressure in the range from equal to or more than 0.5 bar absolute to equal to or less than 10 bar absolute (0.05 MegaPascal to 1.0 MegaPascal), more preferably from equal to or more than 1.0 bar absolute to equal to or less than 6 bar absolute (0.1 MegaPascal to 0.6 MegaPascal).

The regenerated catalytic cracking catalyst can be recycled to the catalytic cracking step. In a preferred embodiment a side stream of make-up catalyst is added to the recycle stream to make-up for loss of catalyst in the reaction zone and regenerator.

In the catalytic cracking process one or more cracked products are produced. The one or more cracked products may contain one or more oxygen-containing-hydrocarbons. Examples of such oxygen-containing-hydrocarbons include ethers, esters, ketones, acids and alcohols. In specific the one or more cracked products may contain phenols.

In a preferred embodiment this/these one or more cracked products is/are subsequently fractionated to produce one or more product fractions.

Fractionation may be carried out in any manner known to the skilled person in the art to be suitable for fractionation of products from a catalytic cracking unit. For example the fractionation may be carried out as described in the Handbook titled "Fluid Catalytic Cracking technology and operations", by Joseph W. Wilson, published by PennWell Publishing Company (1997), pages 14 to 18, and chapter 8, especially pages 223 to 235, herein incorporated by reference.

The one or more product fractions may contain one or more oxygen-containing-hydrocarbons. Examples of such oxygen-containing-hydrocarbons include ethers, esters, ketones, acids and alcohols. In specific one or more product fractions may contain phenols and/or substituted phenols.

In a further embodiment at least one of the one or more product fractions obtained by fractionation are subsequently hydrodeoxygenated to produce a hydrodeoxygenated product fraction. This/these hydrodeoxygenated product fraction(s) may be used as biofuel and/or biochemical component(s).

By hydrodeoxygenation is herein understood reducing the concentration of oxygen-containing hydrocarbons in one or more product fraction(s) containing oxygen-containing hydrocarbons by contacting the one or more product fraction(s) with hydrogen in the presence of a hydrodeoxygenation catalyst. Oxygen-containing hydrocarbons that can be removed include acids, ethers, esters, ketones, aldehydes, alcohols (such as phenols) and other oxygen-containing compounds.

The hydrodeoxygenation preferably comprises contacting of the one or more product fractions with hydrogen in the presence of an hydrodeoxygenation catalyst at a temperature in the range from equal to or more than 200° C., preferably equal to or more than 250° C., to equal to or less than 450° C., preferably equal to or less than 400° C.; at a total pressure in the range of equal to or more than 10 bar absolute (1.0 MegaPascal) to equal to or less than 350 bar absolute (35 MegaPascal); and at a partial hydrogen pressure in the range of equal to or more than 2 bar absolute (0.2 MegaPascal) to equal to or less than 350 bar absolute (35 MegaPascal).

The hydrodeoxygenation catalyst can be any type of hydrodeoxygenation catalyst known by the person skilled in the art to be suitable for this purpose.

The hydrodeoxygenation catalyst preferably comprises one or more hydrodeoxygenation metal(s), preferably supported on a catalyst support.

Most preferred are hydrodeoxygenation catalysts comprising Rhodium on alumina ($Rh/Al_2O_3$), Rhodium-Cobalt on alumina ($RhCo/Al_2O_3$), Nickel-Copper on alumina ($NiCu/Al_2O_3$), Nickel-Tungsten on alumina ($NiW/Al_2O_3$), Cobalt-Molybdenum on alumina ($CoMo/Al_2O_3$) or Nickel-Molybdenum on alumina ($NiMo/Al_2O_3$).

If the one or more product fractions also contain one or more sulphur-containing hydrocarbons it may be advantageous to use a sulphided hydrodeoxygenation catalyst. If the hydrodeoxygenation catalyst is sulphided the catalyst may be sulphided in-situ or ex-situ.

In addition to the hydrodeoxygenation, the one or more product fractions may be subjected to hydrodesulphurization, hydrodenitrogenation, hydrocracking and/or hydroisomerization. Such hydrodesulphurization, hydrodenitrogenation, hydrocracking and/or hydroisomerization may be carried out before, after and/or simultaneously with the hydrodeoxygenation.

In a preferred embodiment the one or more product fractions produced in the fractionation; and/or the one or more hydrodeoxygenated product(s) produced in the hydrodeoxygenation can be blended as a biofuel component and/or a biochemical component with one or more other components to produce a biofuel and/or a biochemical. Examples of one or more other components with which the one or more hydrodeoxygenated product(s) may be blended include anti-oxidants, corrosion inhibitors, ashless detergents, dehazers, dyes, lubricity improvers and/or mineral fuel components, but also conventional petroleum derived gasoline, diesel and/or kerosene fractions.

Alternatively the one or more product fractions and/or the one or more hydrodeoxygenated product(s) can be used as an intermediate in the preparation of a biofuel component and/or a biochemical component. In such a case the biofuel component and/or biochemical component may be subsequently blended with one or more other components (as listed above) to prepare a biofuel and/or a biochemical.

By a biofuel respectively a biochemical is herein understood a fuel or a chemical that is at least party derived from a renewable energy source.

In FIG. 1 one embodiment according to the invention is illustrated. In FIG. 1, wood parts (102) are fed into a torrefaction unit (104), wherein the wood is torrefied to produce torrefied wood (108) and gaseous products (106) are obtained from the top. The torrefied wood (108) is forwarded to a miller (110), wherein the torrefied wood is milled into milled torrefied wood particles (112). The milled torrefied wood particles (112) are subsequently forwarded to an extruder (114) where they are mixed with naphtha (116) (used as a hydrocarbon-containing fluid) and wherein the particle size of the milled torrefied wood particles is simultaneously further reduced. In the extruder a suspension (118) is produced. The torrefied wood particles in the suspension (118) have a particle size distribution with a mean particle size that is smaller than the mean particle size of the milled torrefied wood particles (112). The suspension (118) is fed into the bottom of an FCC reactor riser (120). In the FCC reactor riser (120) the suspension (118) is contacted with new and regenerated catalytic cracking catalyst (122) at a catalytic cracking temperature. A mixture of spent catalytic cracking catalyst and produced cracked products is separated in a separator located in reaction vessel (126). The spent catalytic cracking catalyst (128) is forwarded to a regenerator (130), where it is regenerated with an oxygen containing gas (131) that is provided to the regenerator to produce carbon dioxide and a regenerated catalytic cracking catalyst. The regenerated catalytic cracking catalyst is recycled to the bottom of the riser reactor as part of the regenerated catalytic cracking catalyst (122). The cracked products (124) are forwarded to a fractionator (132). In the fractionator (132) the cracked products (124) are fractionated into several product fractions, such as for example, a first fraction, which may be a gasoline containing fraction (140), a second fraction (138), a third fraction (136) and a fourth fraction (134) as shown in the FIGURE. The number of the fractions and each of the fraction cuts may vary depending on the desired product and market demand. The gasoline containing fraction (140) is forwarded to a hydrodeoxygenation reactor (142) where it is hydrodeoxygenated over a Nickel-Molybdenum on alumina catalyst to produce a hydrodeoxygenated product (144). The hydrodeoxygenated product can be blended with one or more other components to produce a biofuel suitable for use in automotive engines.

EXAMPLES

The invention will now be further illustrated by means of the following non-limiting examples.

Example 1

Preparation of a Mixture of Milled Torrefied Poplar Wood with Long Residue

Chips of poplar wood were torrefied at 250° C. for 6 hours. These were finely milled using a Retch PM 400 ball mill for 4 hours and at 400 rpm to produce a micronized torrefied wood material. The milled torrefied poplar wood had an apparent Bulk Density of 0.42 g/mL and a particle size distribution with a mean particle size of 36 micrometer (as measured at a Horiba LA950, Laser Scattering Particle Size Distribution Analyzer). The milled torrefied poplar wood was dried during 1 day at 105° C. Subsequently the milled torrefied poplar wood (MTPW) was suspended in a Long Residue (LR) in weight ratios as indicated below:

1a) 0 wt % MTPW and 100 wt % LR;
1b) 5 wt % MTPW and 95 wt % LR;
1c) 10 wt % MTPW and 90 wt % LR;
1d) 20 wt % MTPW and 80 wt % LR.

The above combinations of milled torrefied poplar wood and Long Residue were shaken and stirred for 1 hour at room temperature and mixed/shredded for 1 hour with an Inline Ultra Turrax extruder at 80° C. to give a pumpable suspension of milled torrefied poplar wood particles in Long Residue. The use of the inline Ultra Turrax extruder allows one to mix the milled torrefied poplar wood and the Long Residue whilst simultaneously further reducing the mean particle size of the milled torrefied poplar wood particles.

Example 2

Fluidized Catalytic Cracking of a Mixture of Long Residue and Milled Torrefied Poplar Wood at 520° C.

Mixtures of milled torrefied poplar wood and Long Residue as listed under 1a, 1b, 1c and 1d were injected as feed mixtures from a stirred feed vessel at 60° C. into a fluidised bed of a MAT-5000 fluidized catalytic cracking unit. The mixtures remained stable during injection and allowed for a constant flow of feed without fluctuations in biomass particle concentration.

What is claimed is:

1. A catalytic cracking process comprising
a) preparing a suspension of solid biomass particles in a hydrocarbon-containing liquid, comprising
a first particle size reduction step wherein the particle size of a solid biomass material is reduced to produce a first particulate product comprising solid biomass particles;
a mixing step, wherein the first particulate product is suspended in a hydrocarbon-containing liquid to produce a suspended first particulate product comprising solid biomass particles suspended in the hydrocarbon-containing liquid; and
a second particle size reduction step, wherein the particle size of the suspended first particulate product is further reduced to produce a suspended second particulate product comprising solid biomass particles suspended in the hydrocarbon-containing liquid; and
b) contacting the suspension produced in step a) with a catalytic cracking catalyst at a temperature of more than 400° C. in a catalytic cracking reactor to produce one or more cracked products.

2. The process of claim 1 wherein the first particulate product has a particle size distribution with a mean particle size S1 and the second particulate product has a particle size distribution with a mean particle size S2 and wherein S2 is smaller than S1.

3. The process of claim 2 wherein at least 80 wt % of the first particulate product has a particle size of equal to or less than 300 micrometer and wherein at least 80 wt % of the second particulate product has a particle size of equal to or less than 100 micrometer.

4. The process of claim 1 wherein the hydrocarbon-containing liquid comprises straight run (atmospheric) gas oils, flashed distillate, vacuum gas oils (VGO), coker gas oils, naphtha, diesel, kerosene, atmospheric residue ("long residue") and vacuum residue ("short residue") and/or mixtures thereof.

5. The process of claim 1 wherein the first particle size reduction step is carried out by means of a hammer mill or roller mill.

6. The process of claim 1 wherein the mixing step and the second particle size reduction step are carried out simultaneously.

7. The process of claim 6 wherein the mixing step and the second particle size reduction step are carried out simultaneously in a colloid mixer or extruder.

8. The process of claim 1 wherein the solid biomass material used in the first particle size reduction step is a torrefied solid biomass material.

9. The process of claim 1 further comprising a torrefaction step in between the first particle size reduction step and the mixing step, wherein the first particulate product is torrefied.

10. The process of claim 1 wherein the one or more cracked products is/are subsequently fractionated to produce one or more product fractions.

11. The process of claim 10 wherein the one or more product fractions obtained by fractionation are subsequently hydrodeoxygenated to obtain one or more hydrodeoxygenated products.

12. The process of claim 10 wherein the one or more product fractions are blended with one or more other components to prepare a biofuel and/or a biochemical.

13. The process of claim 11 wherein the one or more hydrodeoxygenated product fractions are blended with one or more other components to prepare a biofuel and/or a biochemical.

14. The process of claim 1 wherein the hydrocarbon-containing liquid is obtained from a Fischer-Tropsch oil.

15. A suspension of solid biomass particles in a hydrocarbon-containing liquid, produced by a process comprising
a first particle size reduction step wherein the particle size of a solid biomass material is reduced to produce a first particulate product comprising solid biomass particles;
a mixing step, wherein the first particulate product is suspended in a hydrocarbon-containing liquid to produce a suspended first particulate product comprising solid biomass particles suspended in the hydrocarbon-containing liquid; and
a second particle size reduction step, wherein the particle size of the suspended first particulate product is further reduced to produce a suspended second particulate product comprising solid biomass particles suspended in the hydrocarbon-containing liquid.

* * * * *